(12) United States Patent
Bae et al.

(10) Patent No.: US 9,814,006 B2
(45) Date of Patent: Nov. 7, 2017

(54) METHOD AND APPARATUS FOR CONTROLLING UPLINK RANDOM ACCESS PROCEDURE IN MOBILE COMMUNICATION SYSTEM

(71) Applicant: Samsung Electronics Co., Ltd., Suwon-si, Gyeonggi-do (KR)

(72) Inventors: Junghwa Bae, Yongin-si (KR); Sungho Choi, Suwon-si (KR); Mingoo Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 15/029,414

(22) PCT Filed: Oct. 16, 2014

(86) PCT No.: PCT/KR2014/009732
§ 371 (c)(1),
(2) Date: Apr. 14, 2016

(87) PCT Pub. No.: WO2015/056991
PCT Pub. Date: Apr. 23, 2015

(65) Prior Publication Data
US 2016/0242132 A1 Aug. 18, 2016

(30) Foreign Application Priority Data

Oct. 18, 2013 (KR) .................. 10-2013-0124932
Jan. 29, 2014 (KR) .................. 10-2014-0011488

(51) Int. Cl.
*H04W 56/00* (2009.01)
*H04W 74/08* (2009.01)

(52) U.S. Cl.
CPC ... *H04W 56/0005* (2013.01); *H04W 56/0045* (2013.01); *H04W 74/0833* (2013.01)

(58) Field of Classification Search
CPC ......... H04W 56/0005; H04W 56/0045; H04W 74/0833; H04W 74/04; H04W 74/08
See application file for complete search history.

(56) References Cited

U.S. PATENT DOCUMENTS 8,169,992 B2  5/2012  Parkvall et al.
9,426,765 B2 * 8/2016  Wang ............... H04W 56/0045
(Continued)

FOREIGN PATENT DOCUMENTS

KR  10-2013-0083708 A  7/2013
WO  2013/005972 A2  1/2013
(Continued)

*Primary Examiner* — Ahmed Elallam
(74) *Attorney, Agent, or Firm* — Jefferson IP Law, LLP

(57) ABSTRACT

A signal transmitting/receiving method of a user equipment of a mobile communication system according to an embodiment of the present invention comprises the steps of: transmitting a first random access signal including a first random access preamble to a base station; receiving, from the base station, a first random access response signal including first timing advance (TA) information in response to the first random access signal; transmitting, to the base station, a second random access signal including a second random access preamble based on the state of the user equipment; receiving, from the base station, a second random access response signal including second TA information in response to the second random access signal, when the second random access signal is transmitted to the base station; and transmitting a signal to the base station according to third TA information determined on the basis of at least one of the first TA information and the second TA information. In a random access procedure for initial access to a network by the user equipment according to an embodiment of the present invention, the user equipment transmits, two or more times, an RACH preamble signal to a base station, so that a more accurate TA value can be predicted (Continued)

utilizing TA information from two or more response messages received.

16 Claims, 13 Drawing Sheets

(56) References Cited

U.S. PATENT DOCUMENTS

| | | | |
|---|---|---|---|
| 2011/0249641 A1* | 10/2011 | Kwon | H04W 74/0833 370/329 |
| 2013/0136082 A1* | 5/2013 | Kang | H04W 74/006 370/329 |
| 2013/0188473 A1 | 7/2013 | Dinan | |
| 2013/0272241 A1* | 10/2013 | Ohta | H04W 74/006 370/329 |
| 2013/0322339 A1* | 12/2013 | Ohta | H04L 5/001 370/328 |
| 2014/0112254 A1* | 4/2014 | Lindoff | H04W 74/002 370/328 |
| 2014/0334393 A1* | 11/2014 | Bergstrom | H04W 74/002 370/329 |

FOREIGN PATENT DOCUMENTS

| | | |
|---|---|---|
| WO | 2013/069994 A1 | 5/2013 |
| WO | 2013/112029 A1 | 8/2013 |

* cited by examiner

METHOD AND APPARATUS FOR CONTROLLING UPLINK RANDOM ACCESS PROCEDURE IN MOBILE COMMUNICATION SYSTEM

TECHNICAL FIELD

The present invention relates to a mobile communication and a random access procedure for a terminal (user equipment) to perform an initial access to a network in a communication system. More particularly, this invention relates to a control method and a random access procedure for a terminal (user equipment), adapted to LTE or LTE-Advance systems, to perform an initial access to a network.

BACKGROUND ART

In LTE systems, a random access procedure is divided into a contention-based random access procedure and a non-contention-based random access procedure. A contention-based random access procedure is employed when a terminal, or user equipment (UE), needs initial access to an LTE network so that it accesses the network by competing with a number of UE devices. The non-contention-based random access procedure is employed for: a case that an update is required since an uplink is not synchronized; a function for requesting radio resources; etc. The non-contention-based random access procedure is also employed when UE randomly selects a preamble ID and creates an RACH signal. The non-contention-based random access procedure creates RACH by using only a preamble ID set by a base station, and this distinguishes between the non-contention-based random access procedure and the contention-based random access procedure. Therefore, an apparatus and method is required to perform RACH-related operations more efficiently.

DISCLOSURE OF INVENTION

Technical Problem

The present invention has been made to address the above problems and disadvantages, and to provide at least the advantages described below. Accordingly, the present invention provides a method and an apparatus for efficiently transmitting RACH preambles in a mobile communication system

Solution to Problem

In accordance with an aspect of the present invention, a method of transmitting/receiving signals by a terminal in a mobile communication system is provided. The method includes: transmitting, to a base station, a first random access signal containing a first random access preamble; receiving, from the base station, a first random access response signal containing first timing advance (TA) information in response to the first random access signal; transmitting, to the base station, a second random access signal containing a second random access preamble, based on a state of the terminal; when the second random access signal is transmitted to the base station, receiving, from the base station, a second random access response signal containing second TA information, in response to the second random access signal; and transmitting, to the base station, a signal according to third TA information determined based on the first TA information and/or the second TA information.

In accordance with another aspect of the present invention, a method of transmitting/receiving signals by a base station in a mobile communication system is provided. The method includes: receiving, from a terminal, a first random access signal containing a first random access preamble; transmitting, to the terminal, a first random access response signal containing first timing advance (TA) information in response to the first random access signal; receiving, from the terminal, a second random access signal containing a second random access preamble, based on a state of the terminal; when the second random access signal is received from the terminal, transmitting, to the terminal, a second random access response signal containing second TA information, in response to the second random access signal; and receiving, from the terminal, a signal employing third TA information, based on the first TA information and/or the second TA information.

In accordance with another aspect of the present invention, a terminal of a mobile communication system is provided. The terminal includes: a transceiver for transmitting/receiving signals to/from a base station; and a controller for: controlling the transceiver; transmitting, to the base station, a first random access signal containing a first random access preamble; receiving, from the base station, a first random access response signal containing first timing advance (TA) information in response to the first random access signal; transmitting, to the base station, a second random access signal containing a second random access preamble, based on a state of the terminal; receiving, from the base station, a second random access response signal containing second TA information, in response to the second random access signal transmitted to the base station; and transmitting, to the base station, a signal according to third TA information determined based on the first TA information and/or the second TA information.

In accordance with another aspect of the present invention, a base station of a mobile communication system is provided. The base station includes: a transceiver for transmitting/receiving signals to/from a terminal; and a controller for: controlling the transceiver; receiving, from the terminal, a first random access signal containing a first random access preamble; transmitting, to the terminal, a first random access response signal containing first timing advance (TA) information in response to the first random access signal; receiving, from the terminal, a second random access signal containing a second random access preamble, based on a state of the terminal; transmitting, to the terminal, a second random access response signal containing second TA information, in response to the second random access signal received from the terminal; and receiving, from the terminal, a signal employing third TA information, based on the first TA information and/or the second TA information.

Advantageous Effects of Invention

According to embodiment of the present invention, since the random access procedure for initial access to a network enables UE to transmit RACH preamble signals to one or more RACH base stations two or more times to receive two or more response messages therefrom, the UE can more precisely estimate a Timing Advanced (TA) value, by using TA information items obtained from the received, two or more response messages.

MODE FOR THE INVENTION

Figure 1:
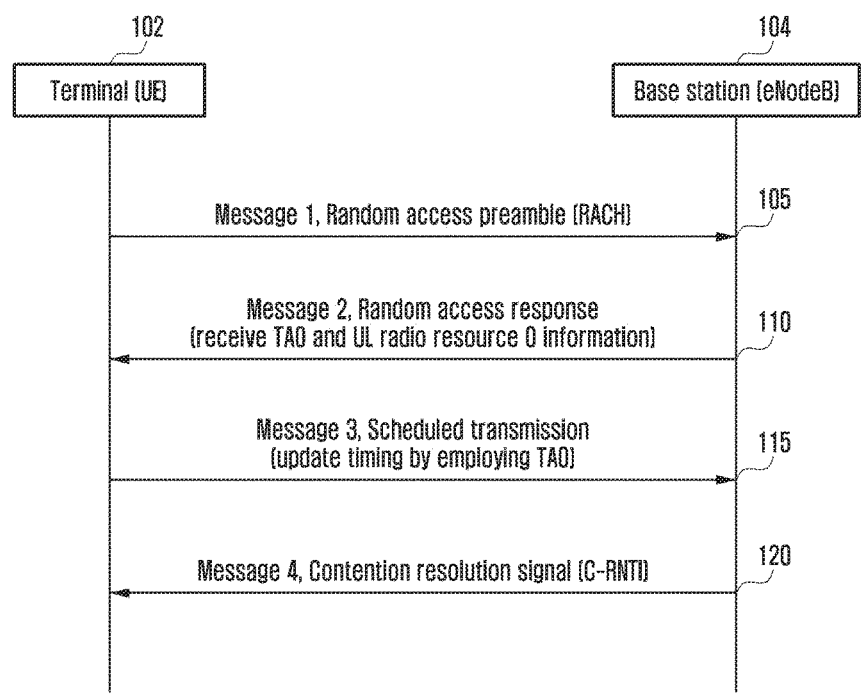
FIG. 1 is a flow diagram that describes an existing, random access method for UE to perform an initial access to a network.

Embodiments of the present invention are described in detail referring to the accompanying drawings.

Detailed descriptions of well-known functions and structures incorporated herein may be omitted to avoid obscuring the subject matter of the invention, The drawings are not necessarily to scale and certain features may be exaggerated, omitted, or simplified in order to better illustrate and explain the invention. The same reference numbers are used throughout the drawings to refer to the same or similar parts.

The features and advantages of the invention and the method to achieve them will become more apparent from the following detailed description in conjunction with the accompanying drawings. It will be easily appreciated to those skilled in the art that various modifications, additions and substitutions are possible from the embodiments of the invention that are illustrated and described in detail in the following description, and the scope of the invention should not be limited to the following embodiments. The embodiments of the present invention are provided such that those skilled in the art will completely understand the invention. It should be understood that the invention may include all modifications and/or equivalents and/or substitutions included in the idea and technical scope of the present disclosure. In the drawings and description, the same or similar elements are denoted by the same reference numerals even though they are depicted in different drawings.

It should be understood that the processes, operations, and a combination thereof in the flowcharts can be performed via computer programming instructions. These computer programming instructions can be installed to processors of data processing equipment that can be programmed, special computers, or universal computers. The instructions, performed via the processors of data processing equipment or the computers, CaO generate means that perform functions described in blocks of the flowchart. In order to implement functions in a particular mode, the computer programming instructions can also be stored in a computer available memory or a computer readable recording memory that can support computers or data processing equipment that can be programmed. Therefore, the instructions, stored in the computer available memory or computer readable memory, can be installed to the products, and perform the functions therein, described in the blocks of the flowchart therein. In addition, since the computer programming instructions can also be installed to computers or data processing equipment that can be programmed, they can generate processes that perform a series of operations therein, described in the blocks of the flowchart therein.

The blocks of the flowchart refer to part of codes, segments or modules that include one or more executable instructions to perform one or more logic functions. It should be noted that the functions described in the blocks of the flowchart may be performed in a different order from the embodiments described above. For example, the functions described in two adjacent blocks may be performed at the same time or in reverse order.

In the embodiments, the terminology, component '~unit,' refers to a software element or a hardware element such as a PGGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

In the present disclosure, embodiments are related to a random access procedure for a terminal (User Equipment), adapted to an LTE communication system, to perform an initial access to a network. Embodiments are described based on an LTE communication system; however, it will be appreciated to those skilled in the art that the subject matter of the present invention can also be applied to various types of communication systems which have the technical background and channel forms similar to those of the present invention, without departing from the scope and sprit of the present invention.

In the following embodiments, an initial access method is performed in such a way as to: transmit an RACH preamble one or more times; receive a message in response to the transmitted RACH preamble; and variously process one or more TA information items contained in the received message, thereby increasing in the precision.

In order to determine the transmission timing of a message, e.g., Message 3, shown in one of the following: FIGS. 3 to 5 and FIGS. 8 and 9, embodiments of the present invention provide various methods including: a method of averaging two received TA values and employing the average value; a method employing a previous TA; a method employing a following TA; etc. Although UE receives a TA value as the timing information from eNodeB, the precision of the TA may be reduced due to the mobility of UE and a sudden channel susceptibility (i.e., a fading phenomenon), multipath, etc. In order to solve the problems, embodiments of the present invention may also provide methods explained as in the following description.

FIG. 1 is a flow diagram that describes an existing, random access method for UE to perform an initial access to a network.

Referring to FIG. 1, when UE 102 performs a contention-based random access procedure with respect to eNodeB 104, it is capable of transmitting a random access preamble to eNodeB 104 via a message, Message 1, in operation 105. UE 102 determines the preamble in a form of RACH signal, i.e., Message 1, by employing a randomly selected preamble ID, and transmits it to eNodeB 104. After transmitting Message 1 to eNodeB 104, UE 102 may wait for the response from the eNodeB 104 for a preset period of time. In the embodiment, the time for waiting for a response (response wait time) may be called a response reception window. The response reception window may be set to UE 102 or determined, based on a higher-layer signal received from the eNodeB 104.

When UE 102 does not receive a response from eNodeB 104 until the response reception window has elapsed, it may re-transmit, to eNodeB 104, the signal containing Message 1 with power ramping, which is higher than power used for the signal when it has been transmitted. In another embodiment, UE 102 may optionally perform the re-transmission of a signal containing Message 1 to eNodeB 104 with power ramping, i.e., increased power higher than that for the previous transmission.

When eNodeB 104 receives the signal containing Message 1 from UE 102, with a power value succeeding in the transmission of Message 1 in operation 105, it is capable of transmitting, to UE 102, a signal containing Message 2, as a response to the RACH signal, in operation 110. In the embodiment, Message 2 may contain one or more of the following: UL resource allocation information (RB allocation size, frequency location), TA synchronous information, power control information, etc.

After receiving Message 2 in operation 110, UE 102 is capable of updating, in eNodeB 104, the transmission timing of a signal containing Message 3 by employing TA information based on information contained in the received Message 2 in Operation 115. Operation 115 may further include a scrambling process by applying a temporary C RNTI received by UE to the Message 2.

The eNodeB 104 is capable of transmitting, to UE 102, Message 4 containing information notifying contention resolution, containing the UE unique information (C_RNTI), thereby ending the initial random access procedure in operation 120. Operations referring to FIG. 1 will also be applied to the following embodiment.

The following description provides random access procedures for UE to perform an initial access to a network according to embodiments of the present invention.

Figure 2:
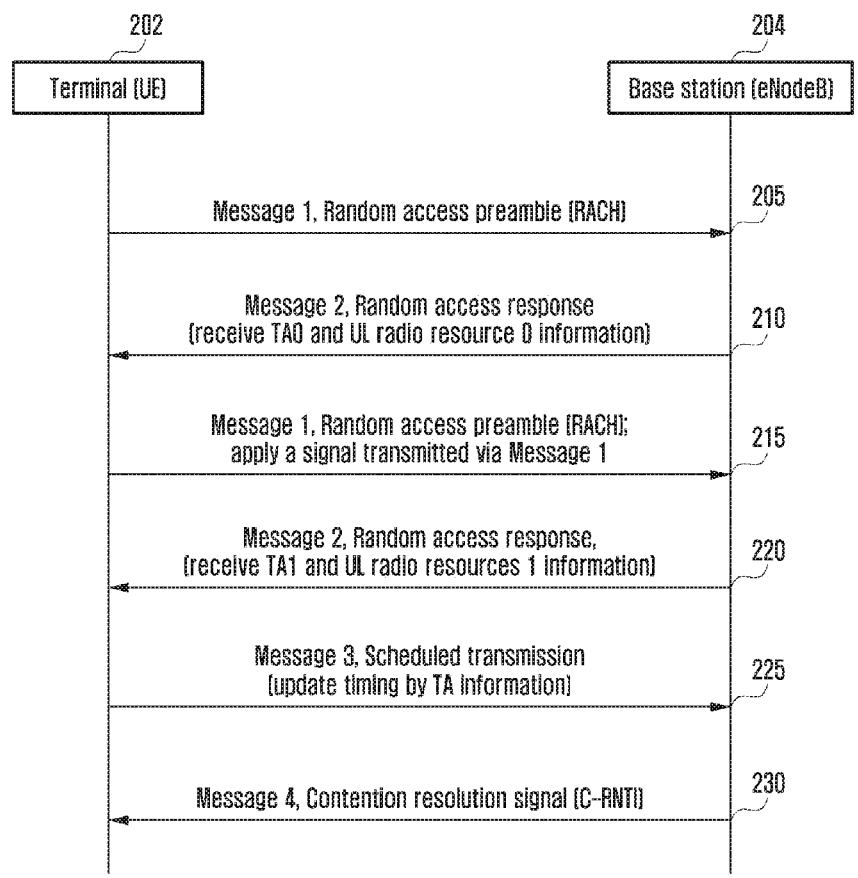
FIG. 2 is a flow diagram that describes a method for UE to perform an initial access to a network according to an embodiment of the present invention.

FIG. 2 is a flow diagram that describes a method for UE to perform an initial access to a network according to an embodiment of the present invention.

Referring to FIG. 2, when UE 202 performs a contention-based random access procedure with respect to eNodeB 204, it is capable of transmitting a signal containing Message 1 to eNodeB 204 in operation 205. Message 1 may contain a random access preamble.

The eNodeB 204 is capable of transmitting, to UE 202, a signal containing Message 2, as a response to the received preamble in operation 210. Message 2 may contain Uplink (UL) resource allocation information and/or TA synchronous information.

After receiving the preamble response in operation 210, UE 202 is capable of re-transmitting, to eNodeB 204, the random access preamble transmitted via the Message 1 in operation 215. In the embodiment, the transmission power for the signal to the eNodeB 204 in operation 215 may be identical to that for the signal to eNodeB 204 in operation 205.

UE 202 is capable of receiving a signal containing Message 2, as a response to the message transmitted to the eNodeB 204 in operation 215, from the eNodeB 204 in operation 220. UE 202 is capable of obtaining TA, synchronous information, based on Message 2.

UE 202 is capable of transmitting a signal containing Message 3 to eNodeB 204 in operation 225. Message 3 may be used for a timing update. In the embodiment. UE 202 may determine the transmission timing of Message 3 based on one or more items of TA information that have been received in the previous operation. The TA information for the transmission of Message 3 may be determined by using the TA information received in operation 210 and/or the TA information received in operation 220.

The eNodeB 204 is capable of transmitting, to UE 202, a signal containing Message 4 notifying contention resolution, containing the UE unique information (C_RNTI) in operation 230.

Figure 3:
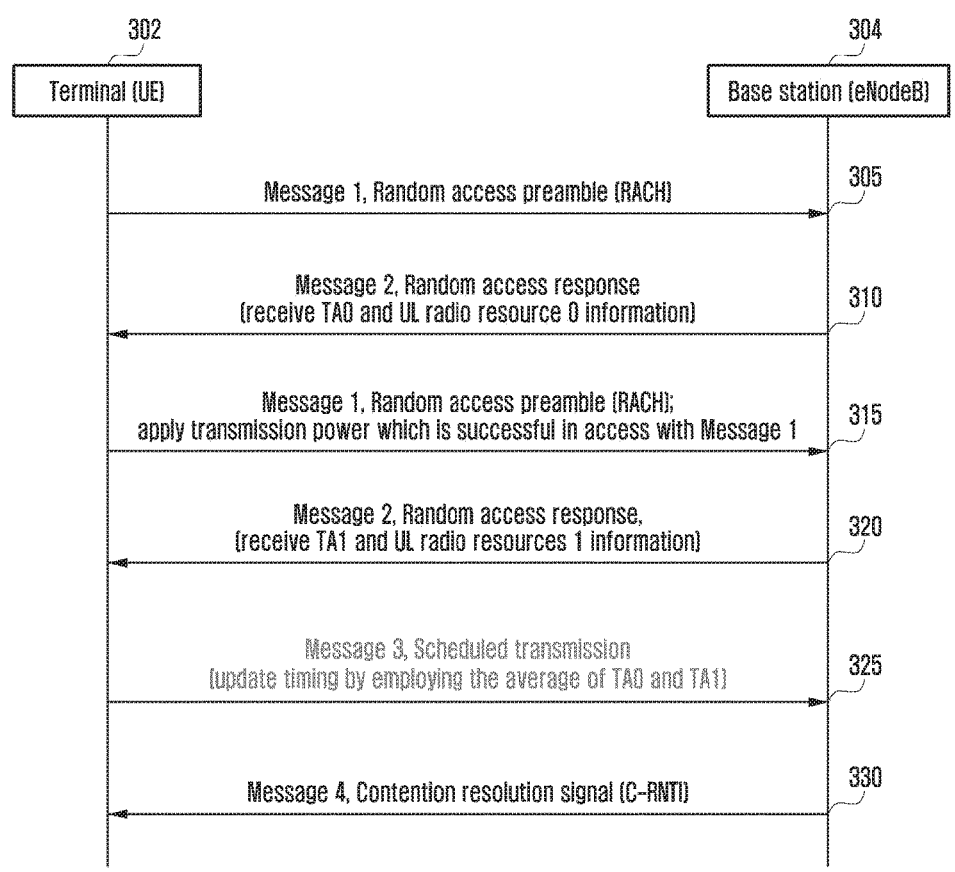
FIG. 3 is a flow diagram that describes a method for UE to perform an initial access to a network according to another embodiment of the present invention.

FIG. 3 is a flow diagram that describes a method for UE to perform an initial access to a network according to another embodiment of the present invention.

Referring to FIG. 3, UE 302 and eNodeB 304 are capable of transmitting/receiving signals to/from each other.

Operations 305 to 320 correspond to operations 205 to 220 shown in FIG. 2, respectively.

UE 302 is capable of calculating the average of the TA information item received in operation 310 and the TA information item received in operation 320 and determining the transmission timing of Message 3 based on the average in operation 325. More specifically, UE 302 is capable of calculating the average of the TA0 value received in operation 310 and the TA1 value received in operation 320 and determining the transmission timing of Message 3 based on the average.

Operation 330 corresponds to operation 230 shown in FIG. 2.

According to the embodiment, although UE 302 receives Message 2 in operations 310 and 320 respectively in a relatively short reception interval of time, it can determine TA information with a relatively high level of precision.

Figure 4:
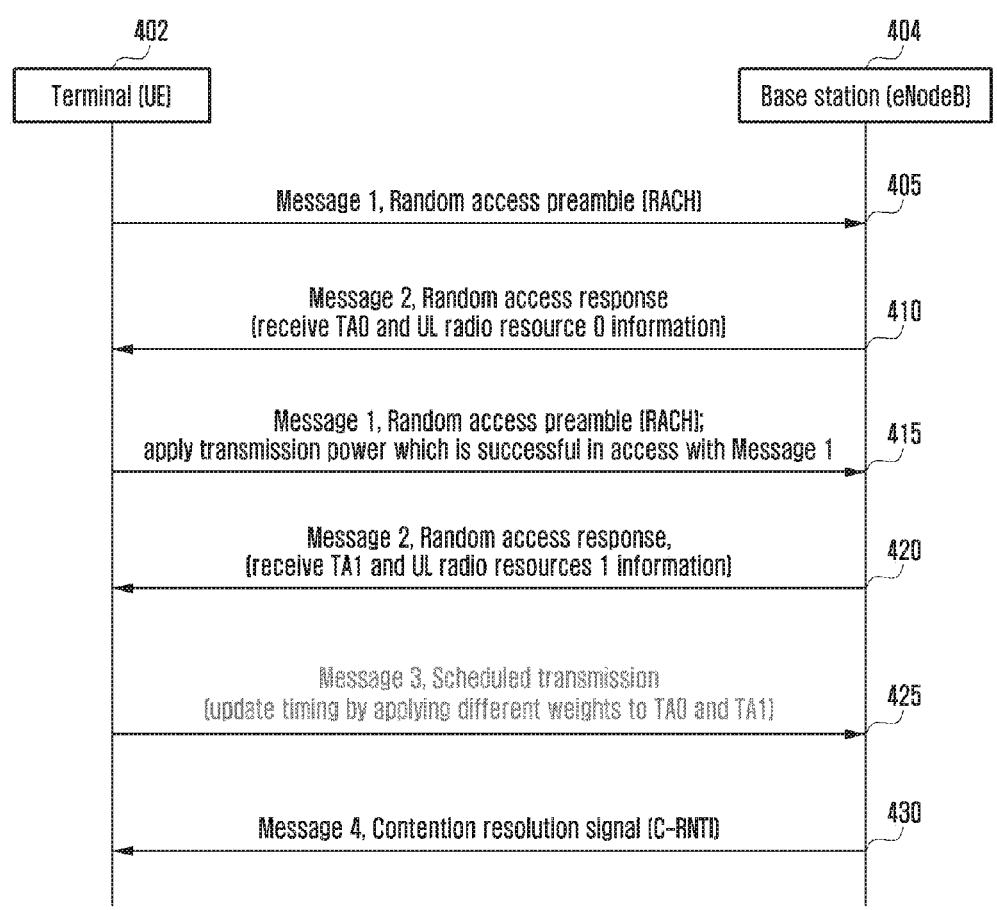
FIG. 4 is a flow diagram that describes a method for UE to perform an initial access to a network according to another embodiment of the present invention.

FIG. 4 is a flow diagram that describes a method for UE to perform an initial access to a network according to another embodiment of the present invention.

Referring to FIG. 4, UE 402 and eNodeB 404 are capable of transmitting/receiving signals to each other.

Operations 405 to 420 correspond to operations 205 to 220 shown in FIG. 2, respectively.

UE 402 is capable of determining TA information to transmit the next message by applying different weights (a) to a TA0 value, received in operation 410, and a TA1 value, received in operation 420, in operation 425. According to various embodiments, TA information may be determined as follows. An embodiment may use a weight (a) which varies between 0 and 1. This method may be implemented in such a way to use a weight (a) value of 0.5 or more when a TA received later is determined to be more precise.

New TA value=TA0*(a−1)+TA1*a

When the weight a is 0.5 TA information may be obtained which is the same result as the embodiment referring to FIG. 3.

Figure 5:
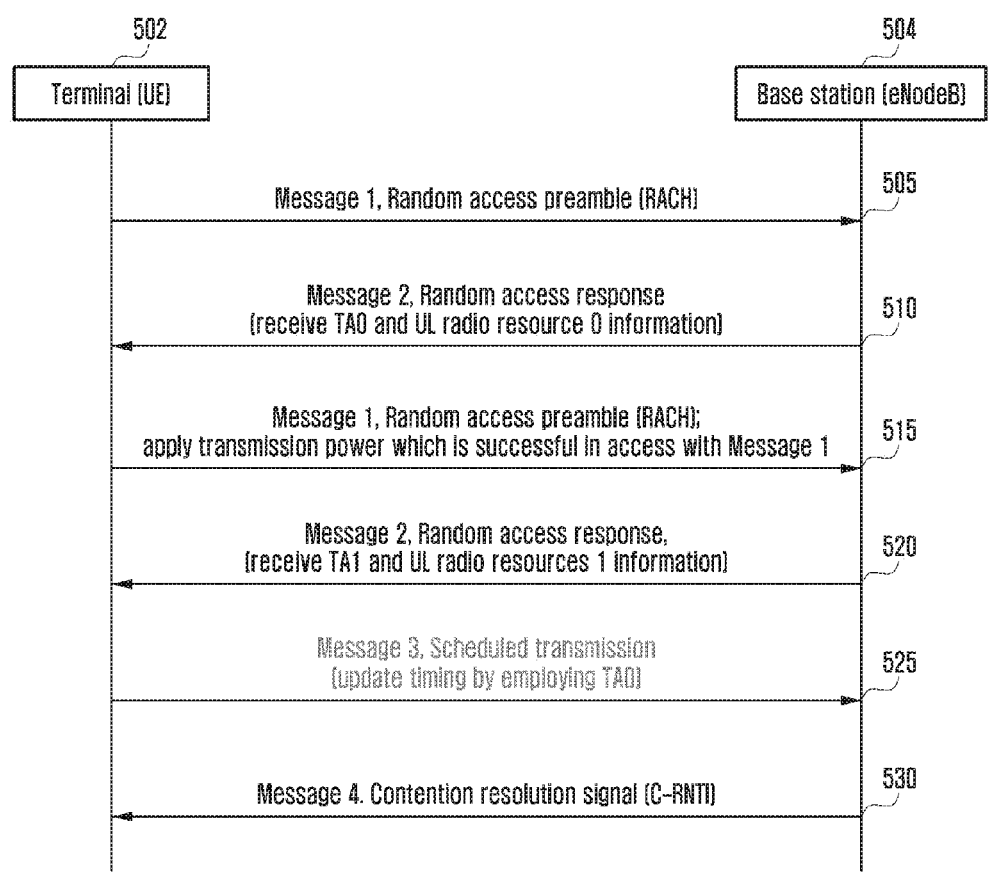
FIG. 5 is a flow diagram that describes a method for UE to perform an initial access to a network according to another embodiment of the present invention.
Figure 6:
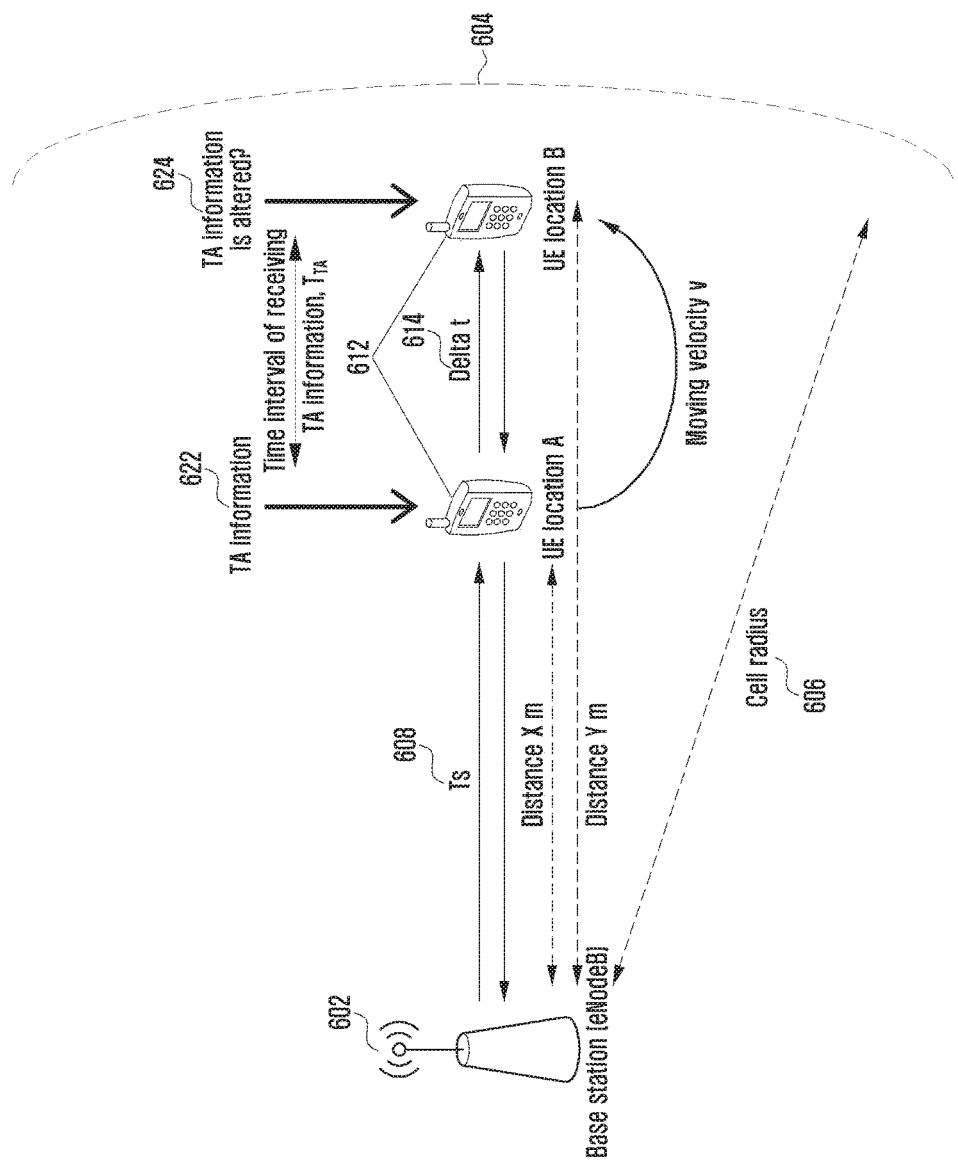
FIG. 6 is a diagram showing the relationship between the location of UE and that of eNodeB over time according to an embodiment of the present invention.
Figure 7:
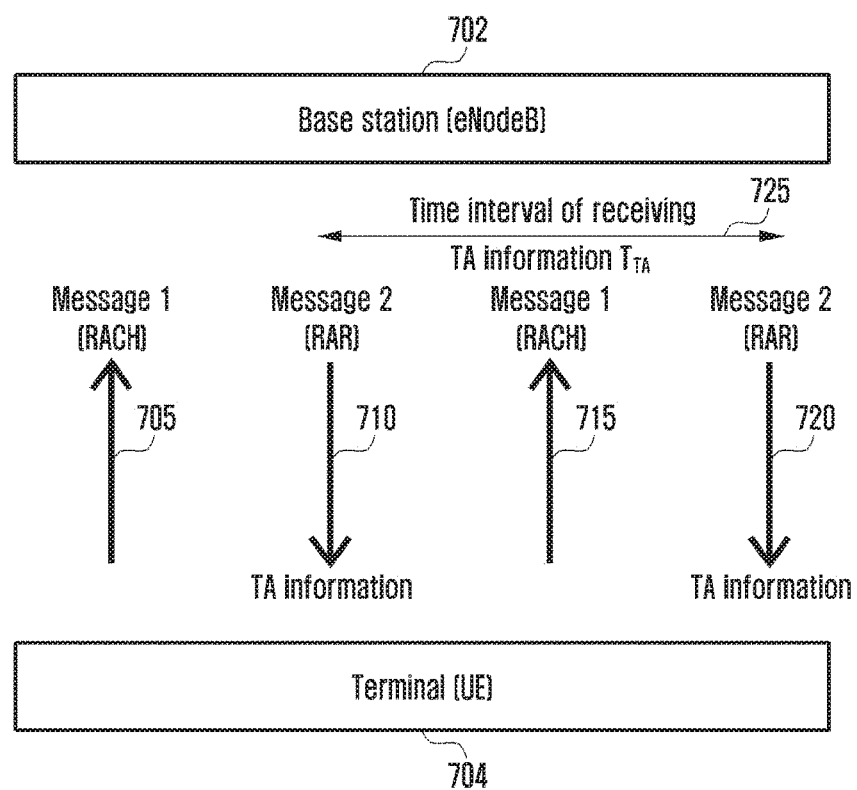
FIG. 7 is a diagram showing the timing of message transmission between UE and eNodeB according to an embodiment of the present invention.

FIG. 5 is a flow diagram that describes a method for UE to perform an initial access to a network according to another embodiment of the present invention. FIG. 6 is a diagram showing the relationship between the location of UE and that of eNodeB over time according to an embodiment of the present invention. FIG. 7 is a diagram showing the timing of message transmission between UE and eNodeB according to an embodiment of the present invention.

Referring to FIGS. 5 to 7, UE 502 and eNodeB 504 are capable of transmitting/receiving signals to each other.

Operations 505 to 520 correspond to operations 205 to 220 shown in FIG. 2, respectively.

UE 502 stores TA information (TA0) received in operation 510 in the memory and transmits Message 3 by using the stored TA information in operation 525. According to this method, the time during which the second preamble is transmitted refers to the transmission of a subframe right after the first Message 2 is received, and the second TA information may be ignored.

Operation 530 corresponds to operation 230 shown in FIG. 2.

As shown in FIG. 6, eNodeB 602 may control a cell 604 having a cell radius 606. The embodiment may be applied to UE running in an environment where TA information is hardly altered. Therefore, in order to determine the moving velocity (speed) of UE to affect TA information 622 and 624 of Message 2 received twice, the maximum velocity of UE needs to be analyzed. In an LTE system, a unit (measure) of one TA is 0.52 µs. As shown in FIG. 6, when UE is located at a location A, the distance can be expressed bellow, using the equation of velocity (=displacement/time).

$3 \times 10^8$ [m/s]*$Ts$[s]=$x$[m]

In the equation, $3 \times 10^8$ [m/s] denotes the propagation speed of an electromagnetic wave, and Ts [s] represents a time that an electromagnetic wave takes to travel from eNodeB 602 to UE 612. x [m] is a distance between eNodeB and UE at location A. When UE moves at a velocity, v, from location A to B, the distance can be expressed bellow.

$3 \times 10^8$ [m/s]*($Tx$+delta $t$)[s]=$y$[m]

In the equation, delta t [s] denotes a time that an electromagnetic wave takes to travel from location A to y [m] is a distance between eNodeB and UE at location B.

When the two equations described above are added, it can be expressed below.

$3 \times 10^8$ [m/s]*delta $t$[s]=($y$−$x$)[m]

Referring to FIG. 7, eNodeB 702 and UE 704 are capable of transmitting/receiving Message 1 (indicated reference numbers 705 and 715) and Message 2 (indicated reference numbers 710 and 720) to/from each other, as in embodiment 2. Since TA needs to consider a round trip, delta t is 1TA/2, i.e., 0.52/2 µs. When this value is applied to the equation, the displacement of UE 612 can be calculated as 78 m. That is, the correlation between the velocity of UE, v, and the reception interval of TA information, $T_{TA}$ [s] (indicated by the reference number 725), can be obtained bellow.

$v$[m/s]*$T_{TA}$[s]=78 [m]

For example, when $T_{TA}$ is 20 ms, the velocity is 14,040 km/h. Although the distance is 100 ms, the velocity is 2,808 km/h, and thus the TA value is not easy to vary. Although TA0 of Message 2 received in operation 510 is employed, the TA value hardly varies, and this does not affect the system.

Figure 8:
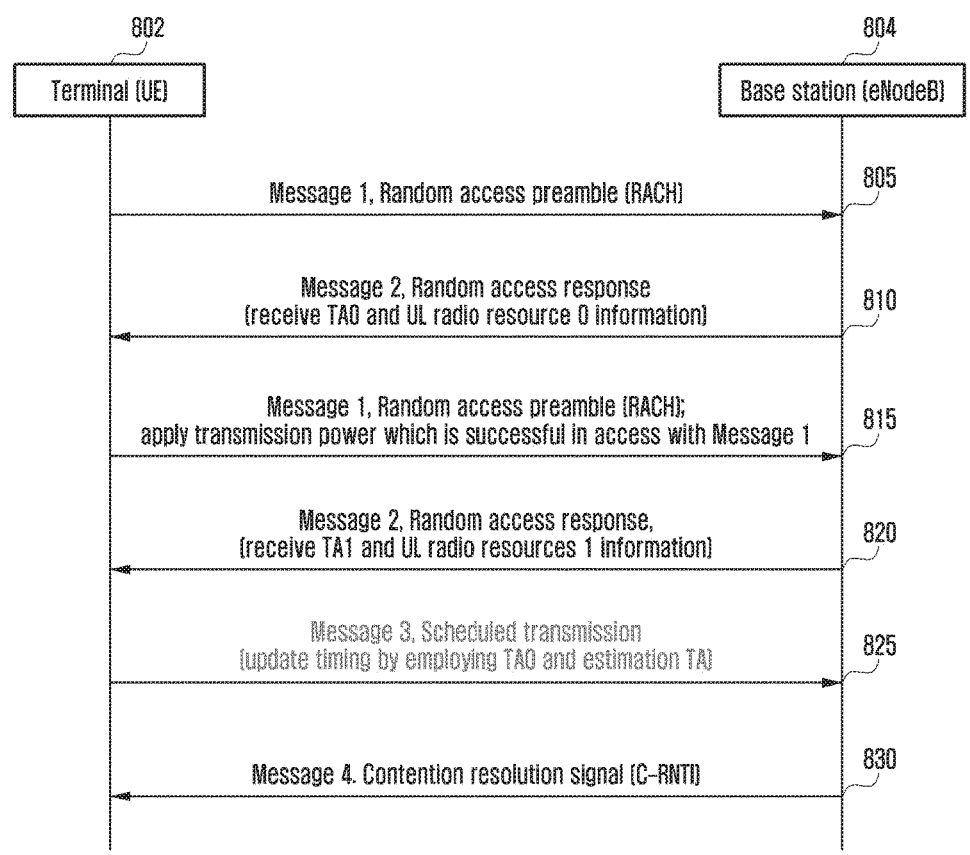
FIG. 8 is a flow diagram that describes a method for UE to perform an initial access to a network according to another embodiment of the present invention.

FIG. 8 is a flow diagram that describes a method for UE to perform an initial access to a network according to another embodiment of the present invention.

Referring to FIG. 8, UE 802 and eNodeB 804 are capable of transmitting/receiving signals to/from each other.

Operations 805 to 820 correspond to operations 205 to 220 shown in FIG. 2, respectively.

The reception interval of TA information, TTA, may increase due to a certain cause. TA may be altered due to the channel and movement of sudden UE 802. In this case, the altered TA value is additionally estimated, thereby producing the last TA value as follows.

$T$ [s]=TA value received via the first Message 2 (as in operation 810)+estimated TA value In the equation described above, the estimated TA value may be determined based on the velocity of UE 802, measured by a velocity measurement unit of the UE 802. According to various embodiments, the velocity measurement unit may include a Doppler estimating unit. UE 802 is capable of updating the timing in the eNodeB 804, by employing the TA value determined by the equation above in operation 825.

Operation 830 corresponds to operation 230 shown in FIG. 2.

Figure 9:
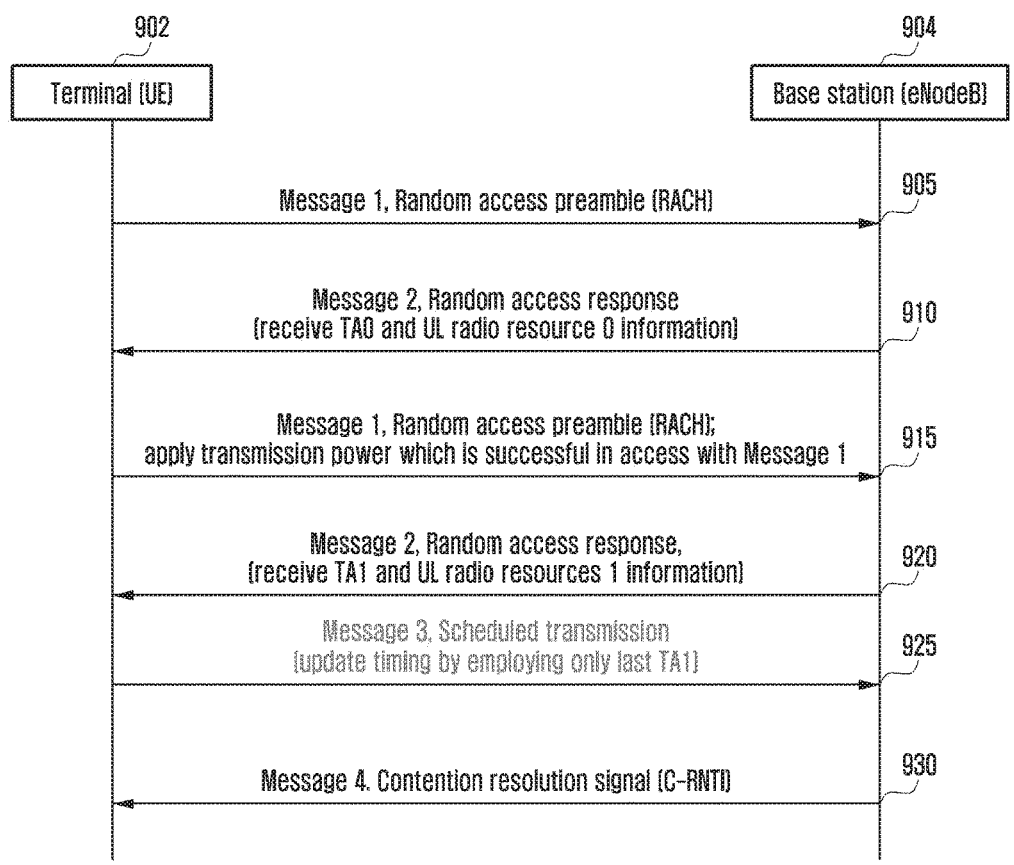
FIG. 9 is a flow diagram that describes a method for UE to perform an initial access to a network according to another embodiment of the present invention.

FIG. 9 is a flow diagram that describes a method for UE to perform an initial access to a network according to another embodiment of the present invention.

Referring to FIG. 9, UE 902 and eNodeB 904 are capable of transmitting/receiving signals to/from each other.

Operations 905 to 920 correspond to operations 205 to 220 shown in FIG. 2, respectively.

In operation 925, UE 902 is capable of adjusting the transmission timing of Message 3, by using only TA information received in operation 920, while ignoring TA information received in operation 910. The embodiment may be applied in a case where TA0 information that has been received earlier is determined as not precise because the time has elapsed.

When UE 902 transmits the second RACH preamble to eNodeB 904 in operation 915, the transmission power of a signal transmitting the second preamble may be basically determined to be the same as that which is successful in access with the first preamble. However, since these methods need to receive TA information of Message 2 twice, a time required for the reception increases and this may alter the transmission power. Therefore, the transmission power for the second preamble may be updated by adding an estimated power value to the existing power value as follows.

Transmission power of the second preamble=Transmission power of the first preamble+estimated power offset The estimated power offset may be estimated by comparing RSRP values measured from two of Message 2.

Operation 930 corresponds to operation 230 shown in FIG. 2.

Figure 10:
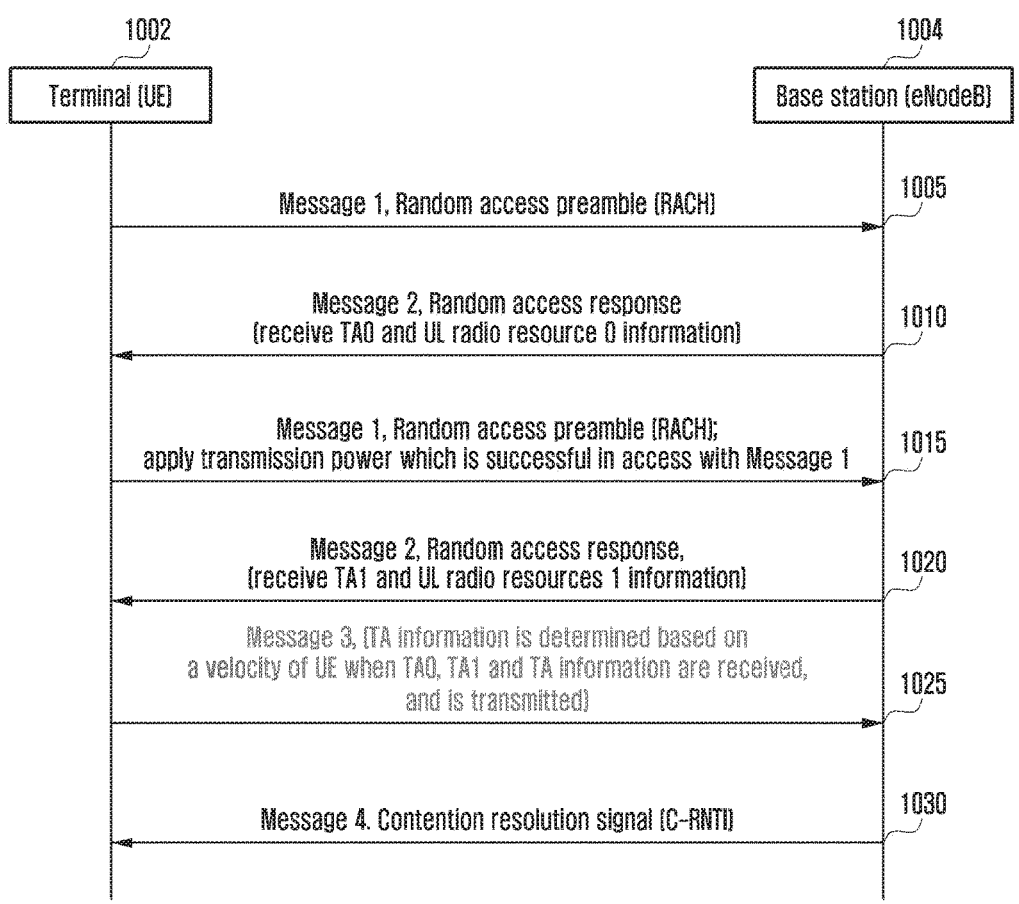
FIG. 10 is a flow diagram that describes a method for UE to perform an initial access to a network according to another embodiment of the present disclosure.

FIG. 10 is a flow diagram that describes a method for UE to perform an initial access to a network according to another embodiment of the present disclosure.

Referring to FIG. 10, UE 1002 and eNodeB 1004 are capable of transmitting/receiving signals to/from each other.

Operations 1005 to 1020 correspond to operations 205 to 220 shown in FIG. 2, respectively.

In operation 1025, UE 1002 is capable of determining TA information, based on one or more of the following: TA0 received in operation 1010, TA1 received in operation 1020, and velocities of UE measured in operations 1005 to 1020, and updating timings in eNodeB 1004.

More specifically, when the moving distance of UE increases due to its relatively large velocity while requesting TA information, the received TA value may be correct. When UE moves relatively fast while performing an operation for receiving TA, a more precise TA value can be obtained by employing a small weight value (a), described in the embodiment referring to FIG. 4. A condition as to whether a velocity is large is determined based on a threshold value as a standard. When the velocity of UE increases, the weight value (a) may be reduced in proportion thereto.

Operation 1030 corresponds to operation 230 shown in FIG. 2.

Figure 11:
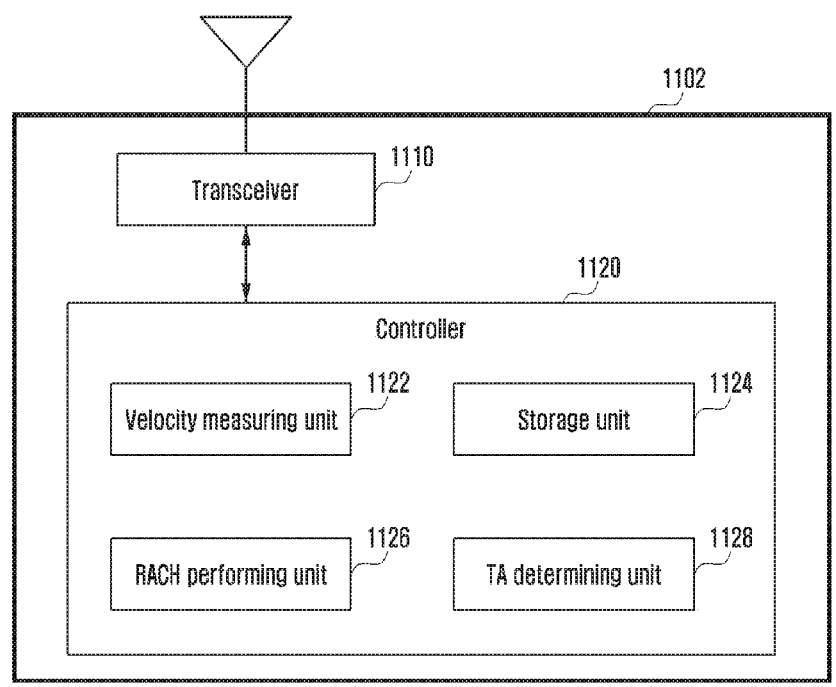
FIG. 11 is a block diagram showing the configuration of UE according to an embodiment of the present disclosure.

FIG. 11 is a block diagram showing the configuration of UE according to an embodiment of the present disclosure.

Referring to FIG. 11, UE 1102 is capable of including a transceiver 1110 and a controller 1120. The controller 1120 is capable of including one or more of the following: a velocity measuring unit 1122, a storage unit 1124, an RACH performing unit 1126, and a TA determining unit 1128. It should be understood that the controller 1120 is not limited to the number or types of components listed above and the functions of the components may be operated in separate devices or same devices.

The transceiver 1110 is capable of transmitting/receiving signals to/from eNodeB, e.g., signals containing Message 1 to Message 4 described in the embodiments.

The controller 1120 is capable of controlling all operations of UE 1102 including the transceiver 1110.

The velocity measuring unit 1122 is capable of measuring the moving velocity of the UE 1102. The velocity measuring unit 1122 may include a GPS module, a Doppler estimating unit, etc.

The storage unit 1124 is capable of storing data contained in transmitted/received signals, and one or more numerical values required for operations of UE 1102. The storage unit 1124 may include volatile memory devices and non-volatile memory devices.

The RACH performing unit 1126 is capable of selecting a preamble so that UE performs RACH and controlling transmission power of signals for transmitting RACH.

The TA determining unit 1128 is capable of determining a TA value that UE 1102 uses to update the timing in eNodeB, based on one or more TA information items received from the eNodeB. The TA determining unit 1128 may operate according to the method of determining a TA value described in the earlier embodiments.

Figure 12:
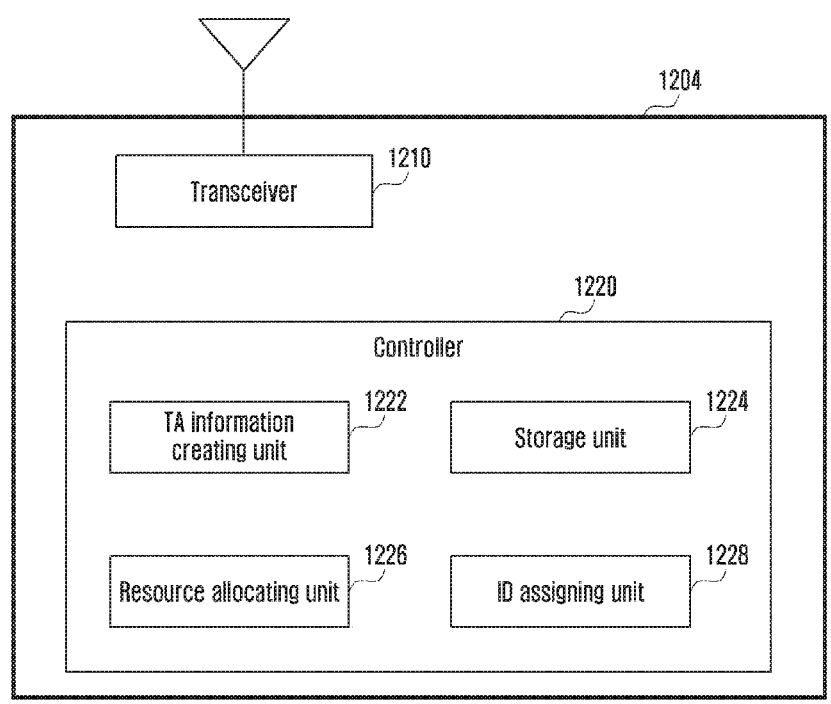
FIG. 12 is a block diagram showing the configuration of eNodeB according to an embodiment of the present disclosure.

FIG. 12 is a block diagram showing the configuration of eNodeB according to an embodiment of the present disclosure.

Referring to FIG. 12, the eNodeB 1104 is capable of including a transceiver 1210 and a controller 1220. The controller 1220 is capable of including one or more of the following: a TA information creating unit 1222, a storage unit 1224, a resource allocating unit 1226 and an ID assigning unit 1228. It should be understood that the controller 1220 is not limited to the number or types of components listed above and the functions of the components may be operated in separate devices or same devices.

The transceiver 1210 is capable of transmitting/receiving signals to/from UE, e.g., signals containing Message 1 to Message 4 described in the embodiments.

The controller 1120 is capable of controlling all operation of eNodeB 1204 including the transceiver 1110.

The TA information creating unit 1222 is capable of creating TA information based on information received from the UE.

The storage unit 1224 is capable of storing data contained in transmitted/received signals, and one or more numerical values required for operations of eNodeB 1204. The storage unit 1224 may include volatile memory devices and non-volatile memory devices.

The resource allocating unit 1226 is capable of allocating radio resources allowing UE to transmit/receive signals to/from eNodeB 1204.

The ID assigning unit 1228 is capable of assigning, to UE, an ID containing C-RNTI, allocated by RACH between UE and eNodeB 1024.

Figure 13:
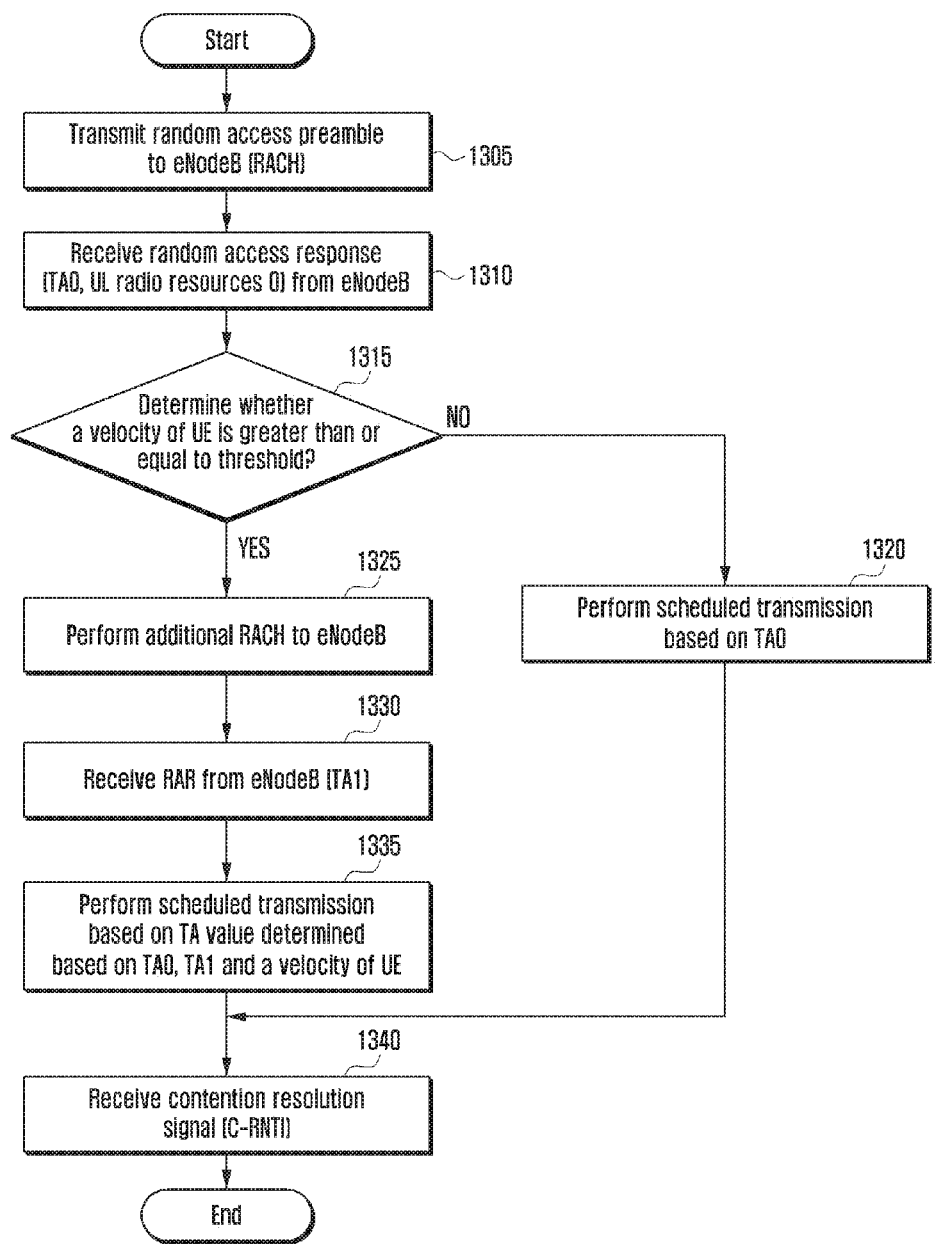
FIG. 13 is a flowchart that describes operations of UE according to an embodiment of the present disclosure.

FIG. 13 is a flowchart that describes operations of UE according to an embodiment of the present disclosure.

Referring to FIG. 13, UE is capable of transmitting a signal containing a random access preamble to eNodeB (RACH).

In operation 1310, the UE is capable of receiving Random Access response (RAR) from the eNodeB. The RAR may contain TA information (TA0) and/or uplink radio resources.

UE is capable of measuring its velocity during the operations 1305 and 1310.

The UE is capable of determining whether its velocity is greater than a threshold value in operation 1315. In another embodiment, the UE may determine whether its velocity is greater than a threshold value in a specified interval for a certain period of time. More specifically, UE is capable of determining whether the velocity exceeds the threshold value at least once during the operations 1305 and 1310. The threshold value may be set to UE or may be determined based on information received from eNodeB.

When the UE ascertains that its velocity is not greater than a threshold value in operation 1315, it is capable of updating the transmission timings in the eNodeB by employing TA information based on the received TA0 in operation 1320. More specifically, when the UE ascertains that its velocity is not greater than a threshold value in operation 1315, it may omit an operation for performing additional RACH to the eNodeB. Preferably, UE may prevent an additional RACH to be transmitted from being transmitted or may omit the transmission of additional RACH.

On the other hand, when the UE ascertains that its velocity is greater than a threshold value in operation 1315, it is capable of performing an additional RACH to the eNodeB in operation 1325. In the embodiment, the UE may perform the same RACH as in operation 1305.

The UE is capable of receiving a signal containing uplink radio resources and TA information (TA1) from the eNodeB in operation 1330.

The UE is capable of measuring its velocity during the operations 1325 and 1330.

The UE is capable of determining a TA value based on one or more of the following: the received TA0 and TA1, and the velocity of UE which is measured a number of times in individual operations, and updating the transmission timing in the eNodeB, based on the determined TA value in operation 1335.

The UE is capable of receiving, from the eNodeB, a signal containing a message notifying contention resolution, containing the unique information (C_RNTI) in operation 1340.

According to an embodiment, the method of performing a contention-based random access procedure between UE and an eNodeB includes: transmitting, by the UE, a random access preamble as Message 1; transmitting, by the eNodeB, Message 2 in response to the received preamble, along with UL resource allocation information and TA0 synchronous information; re-transmitting, by the UE, when receiving the preamble, the random access preamble that has been transmitted via Message 1; re-transmitting, by the eNodeB, Message 2 in response to the received preamble, along with UL resource allocation information and TA1 synchronous information; determining a transmission timing of Message 3 using two items of TA information that have been received in the previous process, and transmitting Message 3; and transmitting, by the eNodeB. Message 4 notifying contention resolution containing the UE unique information (C_RNTI).

In the method of performing a random access procedure according to another embodiment of the present closure, a time to transmit Message 3 may be updated by calculating the average of TA0 and TA1 contained in two of Message 2 which have been received in the previous process and using a new transmitting timing (TA0+TA1)/2. The TA value (=(TA0+TA1)/2) may be applied to the update.

In the method of performing a random access procedure according to another embodiment of the present closure, a time to transmit Message 3 may be updated by applying different weight a and 1−a to a TA0 value received earlier and a TA1 value received later, respectively, as follows.

$$TA\ value = TA0 \times (a-1) + TA1 \times a$$

In the method of performing a random access procedure according to another embodiment of the present closure, a time to transmit Message 3 may update the transmission timing by using only TA0 information received earlier, without using TA1 information received last.

In the method of performing a random access procedure according to another embodiment of the present closure, a time to transmit the second preamble may be transmitted via the next subframe right after Message 2 as a response to the preamble is received.

In the method of performing a random access procedure according to another embodiment of the present closure, in a state where the interval of TA reception time (TTA) increases, when Message 3 needs to be transmitted, a TA value is additionally estimated and thus the last TA value is obtained as follows.

$$T\ [s] = TA\ value\ received\ via\ the\ first\ Message\ 2 + estimated\ TA\ value$$

In the method of performing a random access procedure according to another embodiment of the present closure, the estimated TA value is obtained in such a way that a velocity is obtained by a Doppler estimating unit and an additional TA value is estimated.

In the method of performing a random access procedure according to another embodiment of the present closure, a time to transmit Message 3 is obtained by using TA1 information received last, while ignoring TA0 information received earlier.

In the method of performing a random access procedure according to another embodiment of the present closure, when the second preamble is transmitted, the transmission power is identical to that which is successful in access with the first preamble.

In the method of performing a random access procedure according to another embodiment of the present closure, when a time required for receiving TA information of Message 2 increases, the transmission power may be altered and accordingly the transmission power of the second preamble may be obtained as follows.

$$Transmission\ power\ of\ the\ second\ preamble = Transmission\ power\ of\ the\ first\ preamble + estimated\ power\ offset$$

In the method of performing a random access procedure according to another embodiment of the present closure, the estimated power offset may be estimated by comparing RSRP values measured from two of Message 2.

The embodiments of the present invention described in the description and drawings along with particular terms are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The invention claimed is:

1. A method of transmitting/receiving signals by a terminal in a mobile communication system comprising:
    transmitting, to a base station, a first random access signal containing a first random access preamble;
    receiving, from the base station, a first random access response signal containing first timing advance (TA) information in response to the first random access signal;
    transmitting, to the base station, a second random access signal containing a second random access preamble, based on a state of the terminal;
    when the second random access signal is transmitted to the base station, receiving, from the base station, a second random access response signal containing second TA information, in response to the second random access signal; and
    transmitting, to the base station, a signal according to third TA information determined based on the first TA information and/or the second TA information.

2. The method of claim 1, wherein transmitting a second random access signal to the base station comprises:
    transmitting, to the base station, the second random access signal, when a time interval where a velocity of the terminal is greater than or equal to a preset value is within a time interval corresponding to the transmission of the first random access signal and/or a time interval corresponding to the first random access response signal.

3. The method of claim 1, wherein:
    transmitting a second random access signal to the base station comprises: omitting the transmission of the second random access signal to the base station, when a time interval where a velocity of the terminal is greater than or equal to a preset value is not within a time interval corresponding to the transmission of the first random access signal and/or a time interval corresponding to the first random access response signal; and
    the method comprises: determining the third TA information based on the first TA information.

4. The method of claim 1, further comprising:
determining the third TA information, based on a weight which is determined based on the first TA information, the second TA information, and a velocity of the terminal.

5. A method of transmitting/receiving signals by a base station in a mobile communication system comprising:
receiving, from a terminal, a first random access signal containing a first random access preamble;
transmitting, to the terminal, a first random access response signal containing first timing advance (TA) information in response to the first random access signal;
receiving, from the terminal, a second random access signal containing a second random access preamble, based on a state of the terminal;
when the second random access signal is received from the terminal, transmitting, to the terminal, a second random access response signal containing second TA information, in response to the second random access signal; and
receiving, from the terminal, a signal employing third TA information, based on the first TA information and/or the second TA information.

6. The method of claim 5, wherein receiving a second random access signal comprises:
receiving, from the terminal, the second random access signal, when a time interval where a velocity of the terminal is greater than or equal to a preset value is within a time interval corresponding to the transmission of the first random access signal and a time interval corresponding to the first random access response signal.

7. The method of claim 5, further comprising:
receiving, from the terminal, a signal based on the third TA information which is determined based on the first TA information, when a time interval where a velocity of the terminal is greater than or equal to a preset value is not within a time interval corresponding to the transmission of the first random access signal and a time interval corresponding to the first random access response signal.

8. The method of claim 5, further comprising:
determining the third TA information, based on a weight which is determined based on the first TA information, the second TA information, and a velocity of the terminal and which is applied to a TA value.

9. A terminal of a mobile communication system comprising:
a transceiver for transmitting/receiving signals to/from a base station; and
a controller for: controlling the transceiver; transmitting, to the base station, a first random access signal containing a first random access preamble; receiving, from the base station, a first random access response signal containing first timing advance (TA) information in response to the first random access signal; transmitting, to the base station, a second random access signal containing a second random access preamble, based on a state of the terminal; receiving, from the base station, a second random access response signal containing second TA information, in response to the second random access signal transmitted to the base station; and transmitting, to the base station, a signal according to third TA information determined based on the first TA information and/or the second TA information.

10. The terminal of claim 9, wherein the controller transmits, to the base station, the second random access signal, when a time interval where a velocity of the terminal is greater than or equal to a preset value is within a time interval corresponding to the transmission of the first random access signal and/or a time interval corresponding to the first random access response signal.

11. The terminal of claim 9, wherein:
the controller omits the transmission of the second random access signal to the base station, when a time interval where a velocity of the terminal is greater than or equal to a preset value is not within a time interval corresponding to the transmission of the first random access signal and/or a time interval corresponding to the first random access response signal; and
the third TA information is determined based on the first TA information.

12. The terminal of claim 9, wherein the third TA information is determined, based on a weight which is determined based on the first TA information, the second TA information, and a velocity of the terminal.

13. A base station of a mobile communication system comprising:
a transceiver for transmitting/receiving signals to/from a terminal; and
a controller for: controlling the transceiver; receiving, from the terminal, a first random access signal containing a first random access preamble; transmitting, to the terminal, a first random access response signal containing first timing advance (TA) information in response to the first random access signal; receiving, from the terminal, a second random access signal containing a second random access preamble, based on a state of the terminal; transmitting, to the terminal, a second random access response signal containing second TA information, in response to the second random access signal received from the terminal; and receiving, from the terminal, a signal employing third TA information, based on the first TA information and/or the second TA information.

14. The base station of claim 13, wherein the controller receives the second random access signal from the terminal, when a time interval where a velocity of the terminal is greater than or equal to a preset value is within a time interval corresponding to the transmission of the first random access signal and a time interval corresponding to the first random access response signal.

15. The base station of claim 13, wherein the controller receives, from the terminal, a signal based on the third TA information which is determined based on the first TA information, when a time interval where a velocity of the terminal is greater than or equal to a preset value is not within a time interval corresponding to the transmission of the first random access signal and a time interval corresponding to the first random access response signal.

16. The base station of claim 13, wherein the third TA information is determined based on a weight which is determined based on the first TA information, the second TA information, and a velocity of the terminal and which is applied to a TA value.

* * * * *